United States Patent
Li

(10) Patent No.: US 11,314,712 B2
(45) Date of Patent: Apr. 26, 2022

(54) METHOD AND APPARATUS FOR PROVIDING SERIAL NUMBER, ELECTRONIC DEVICE AND READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Rui Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 240 days.

(21) Appl. No.: 16/496,750

(22) PCT Filed: Mar. 29, 2018

(86) PCT No.: PCT/CN2018/081014
§ 371 (c)(1),
(2) Date: Sep. 23, 2019

(87) PCT Pub. No.: WO2018/177350
PCT Pub. Date: Oct. 4, 2018

(65) Prior Publication Data
US 2020/0081877 A1    Mar. 12, 2020

(30) Foreign Application Priority Data
Apr. 1, 2017 (CN) .......................... 201710211867.5

(51) Int. Cl.
*G06F 16/22*    (2019.01)
*G06F 16/2457*  (2019.01)
(Continued)

(52) U.S. Cl.
CPC .... *G06F 16/2272* (2019.01); *G06F 16/24578* (2019.01); *G06Q 10/067* (2013.01); *G06Q 10/087* (2013.01)

(58) Field of Classification Search
CPC .......... G06F 16/24578; G06F 16/2272; G06Q 10/067
See application file for complete search history.

(56) References Cited

U.S. PATENT DOCUMENTS

2007/0055686 A1* 3/2007 Findlay ................ G06Q 10/087
2016/0162836 A1* 6/2016 Fung ..................... G06Q 10/04
705/29

FOREIGN PATENT DOCUMENTS

CN    101145226 A    3/2008
CN    101299674 A    11/2008
(Continued)

OTHER PUBLICATIONS

English Translation of the International Search Report with Written Opinion for related Application No. PCT/CN2018/081014 dated Jun. 22, 2018 (8 Pages).

(Continued)

*Primary Examiner* — Van H Oberly
(74) *Attorney, Agent, or Firm* — Michael Best & Friedrich LLP

(57) ABSTRACT

The present invention provides a method, an apparatus, an electronic device and a readable storage medium for providing a serial number, capable of configuring different serial number generating methods according to different business scenarios, solving a problem of completely depending on one serial number generating method, enabling to generate a serial number that satisfies a business scenario in time, and finally improving the stability of a logistics distribution system. The method for providing a serial number according to the present invention comprises: stor- (Continued)

ing various serial number generating methods; determining, according to a business scenario of a requester side and from the serial number generating methods, serial number generating methods for the scenario, and then obtaining a list of available methods for the scenario according to the determined serial number generating methods; generating, using a method in the list of available methods, a serial number for the scenario so as to provide the serial number to the requester side.

14 Claims, 3 Drawing Sheets

(51) Int. Cl.
*G06Q 10/06* (2012.01)
*G06Q 10/08* (2012.01)

(56) References Cited

FOREIGN PATENT DOCUMENTS

| | | |
|---|---|---|
| CN | 101533435 A | 9/2009 |
| CN | 101976240 A | 2/2011 |
| CN | 102542340 A | 7/2012 |
| CN | 103164418 A | 6/2013 |
| CN | 105183794 A | 12/2015 |
| CN | 106203952 A | 12/2016 |
| CN | 106649566 A | 5/2017 |
| JP | 2013152580 A | 8/2013 |
| WO | 2014051223 A1 | 4/2014 |

OTHER PUBLICATIONS

China Patent Office Action for Application No. 201710211867.5 dated Mar. 27, 2020 (6 pages).

* cited by examiner

METHOD AND APPARATUS FOR PROVIDING SERIAL NUMBER, ELECTRONIC DEVICE AND READABLE STORAGE MEDIUM

TECHNICAL FIELD

The present invention relates to the technical field of computer, and in particular, to a method, an apparatus, an electronic device, and a readable storage medium for providing a serial number.

BACKGROUND ART

In a logistics distribution system, the generation and acquisition of a waybill number is a very key link. The waybill number is used as a unique identifier for data recording and data interaction in all distribution links including pre-sorting, sorting, goods dispatching, goods receiving, distributing, logistics tracking and the like. With the rapid development of Internet nowadays, large data quantity and high concurrency will put forward higher requirements on the generation of a waybill number.

In the prior art, a waybill number acquired from a merchant backend is generated generally based on a Redis, and the generated waybill number is stored in a memory, such that a case where the waybill number is lost may occur. The existing method for generating a waybill number is relatively single and completely depends on Redis, and a failure of the Redis server would result in the merchant's failure in acquiring a waybill number.

In conclusion, the waybill number generating method in the prior art is single and completely depends on Redis. If the Redis server fails, there will be a problem that a waybill number cannot be generated or the generated waybill number cannot be used, which may not only result in a merchant's failure in acquiring the waybill number but also result in a rapid growth rate of waybill numbers and make the waybill number resources strained due to the waste and loss of waybill numbers.

CONTENTS OF INVENTION

For this reason, the present invention provides a method, an apparatus, an electronic device and a readable storage medium for providing a serial number, capable of configuring different serial number generating methods according to different business scenarios, solving a problem of completely depending on one serial number generating method, enabling to generate a serial number that satisfies a business scenario in time, and finally improving the stability of a logistics distribution system.

In order to realize the above purpose, a method for providing a serial number is provided according to a first aspect of the present invention.

The method for providing a serial number according to the present invention comprises: storing various serial number generating methods; determining, according to a business scenario of a requester side and from the serial number generating methods, serial number generating methods for the scenario, and then obtaining a list of available methods for the scenario according to the determined serial number generating methods; generating, using a method in the list of available methods, a serial number for the scenario so as to provide the serial number to the requester side.

Optionally, the step of determining, according to a business scenario of a requester side and from the serial number generating methods, serial number generating methods for the scenario so as to obtain a list of available methods for the scenario includes: writing the determined methods into a list so as to obtain the list of available methods for the scenario.

Optionally, the step of generating, using a method in the list of available methods, a serial number for the scenario so as to provide the serial number to the requester side includes: invoking a serial number generating method that is ranked as the first one in the list of available methods; determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods.

Optionally, after the step of putting the method into the list of unavailable methods, the method for providing a serial number further comprises: recording the time when the method enters the list of unavailable methods, and then putting the method back into the list of available methods after the elapse of a first set duration.

Optionally, after the step of invoking the methods in the list of available methods in an order of the list, the method for providing a serial number further comprises: determining whether a desired serial number can be generated by a currently invoked method within a second set duration for every set cycle, and if yes, clearing the counter, otherwise, incrementing the counter by 1; determining whether a value of the counter is larger than a first set value, and if yes, putting the method into a list of abnormal methods; otherwise, repeating the step of determining whether the value of the counter is larger than the first set value.

Optionally, after the step of putting the method into the list of abnormal methods, the method for providing a serial number further comprises: recording the time when the method enters the list of abnormal methods, and then putting the method back into the list of available methods after the elapse of a third set duration.

Optionally, the serial number generating method comprises: a database auto-increment ID method, a data table column value generating method, a Redis method, and a snowflake method.

An apparatus for providing a serial number is provided according to a second aspect of the present invention.

The apparatus for providing a serial number according to the present invention comprises: a storing unit for storing various serial number generating methods; a generating unit for determining, according to a business scenario of a requester side and from the serial number generating methods, serial number generating methods for the scenario, and then obtaining a list of available methods for the scenario according to the determined serial number generating methods; a providing unit for generating, using a method in the list of available methods, a serial number for the scenario so as to provide the serial number to the requester side.

Optionally, the generating unit is also used for writing the determined methods into a list so as to obtain a list of available methods for the scenario.

Optionally, the providing unit is also used for: invoking a serial number generating method that is ranked as the first one in the list of available methods; determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods.

Optionally, the apparatus for providing a serial number further comprises a first recording unit for recording the time when the method enters the list of unavailable methods and putting the method back into the list of available methods after the elapse of a first set duration.

Optionally, the apparatus for providing a serial number further comprises a determining unit for: determining whether a desired serial number can be generated by a currently invoked method within a second set duration for every set cycle, and if yes, clearing the counter, and otherwise, incrementing the counter by 1; determining whether a value of the counter is larger than a first set value, and if yes, putting the method into a list of abnormal methods; otherwise, repeating the step of determining whether the value of the counter is larger than the first set value.

Optionally, the apparatus for providing a serial number further comprises a second recording unit for: recording the time when the method enters the list of abnormal methods, and then putting the method back into the list of available methods after the elapse of a third set duration.

Optionally, the serial number generating method comprises: a database auto increment ID method, a data table column value generating method, a Redis method, and a snowflake method.

In order to realize the above purpose, an electronic device is provided according to another aspect of an embodiment of the present invention.

The electronic device according to the embodiment of the present invention comprises: one or more processors; a storage means for storing one or more programs which cause, when executed by one or more processors, the one or more processors to implement the method for providing a serial number according to the embodiment of the present invention.

In order to realize the above purpose, a computer readable medium is provided according to a further aspect of an embodiment of the present invention.

The computer readable medium according to the embodiment of the present invention stores a computer program which implements, when executed by the processors, the method for providing a serial number according to the embodiment of the present invention.

In accordance with the technical solution of the present invention, since different serial number generating methods are pre-stored, it is able to configure different serial number generating methods according to different business scenarios, solve the problem of completely depending a serial number generating method, perform method switching when a method fails, generate in time a serial number that satisfies the business scenario, and finally improve the stability of the logistic distribution system.

The further effects of the above non-conventional alternatives will be described below with reference to the embodiments.

DESCRIPTION OF DRAWINGS

Drawings are intended for a better understanding of the present invention, but do not put limitations on the present invention, wherein.

EMBODIMENTS OF THE DESCRIPTION

Exemplary embodiments of the present invention will be described below with reference to the drawings, including various details of the embodiments of the present invention so as to facilitate the understanding, and they should be only regarded as exemplary. Therefore, those skilled in the art should note that various alterations and modifications can be made to the embodiments described herein without departing from the scope and spirit of the present invention. Likewise, for the sake of clearness and conciseness, descriptions about the well-known functions and structures are omitted in the following descriptions.

Figure 1:
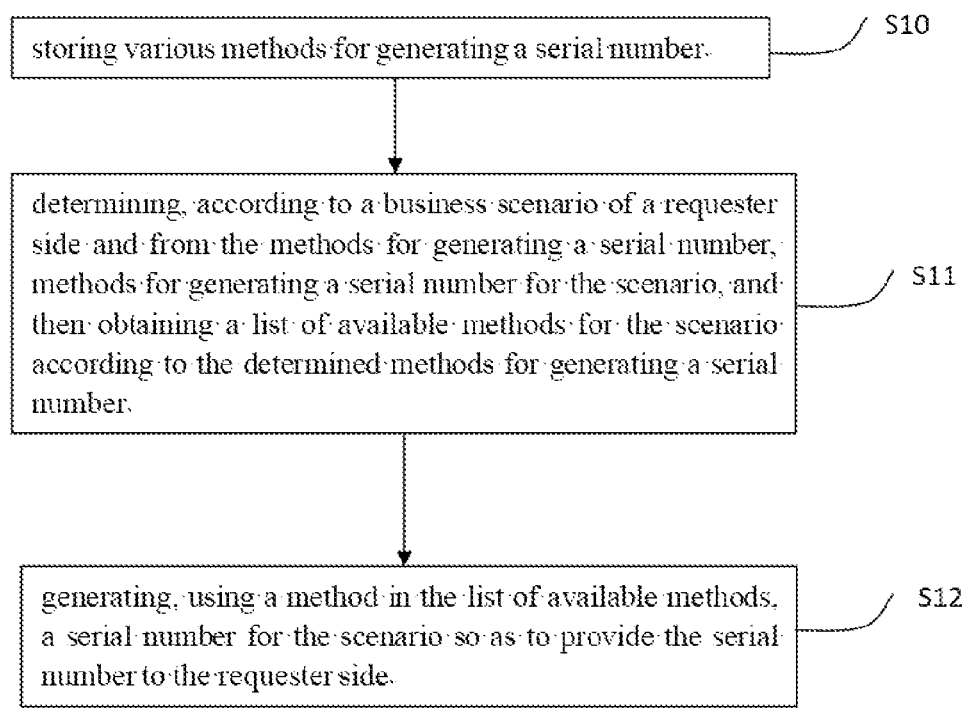
FIG. 1 is a schematic diagram illustrating a method for providing a serial number according to an embodiment of the present application.

FIG. 1 is a schematic diagram illustrating a method for providing a serial number according to an embodiment of the present application. As shown in FIG. 1, the method for providing a serial number according to the embodiment of the present application mainly comprises steps S10 to S12.

S10: storing various serial number generating methods. In the step, the method for providing a serial number comprises: a database auto-increment ID method, a data table column value generating method, a Redis method, and a snowflake method. Various serial number generating methods are pre-stored such that a serial number generating methods that satisfies the scenarios can be selected in different business scenarios, which not only avoids the problem existing in the single serial number generating method but also enables method switching when a method fails and thereby improves the success rate of generating the serial number.

S11: determining, according to a business scenario of a requester side and from the serial number generating methods, serial number generating methods for the scenario, and then obtaining a list of available methods for the scenario according to the determined serial number generating methods. In this step, when the requester side acquires a serial number (such as an express number), suppose that the methods capable of generating a serial number that satisfies the scenario, among the methods for generating a serial number as stored in the step S10, are a database auto-increment ID method, a data table column value generating method, a Redis method, and a snowflake method according to the business scenario of the requester side, then the three methods are written into the list after determining the specific methods so as to obtain a list of available methods for the scenario.

S12: generating, using a method in the list of available methods, a serial number for the scenario so as to provide the serial number to the requester side. In S12, the first method in the list of available methods is first invoked. Suppose that the three methods in S11 are ranked in an order of a database auto-increment ID method, a data table column value generating method, a Redis method, and a snowflake method, then the database auto-increment ID method is first invoked to generate a serial number for the scenario, and then judgment is made as to whether a desired serial number is successfully generated by the currently invoked method, and if yes, the serial number generated by the method is returned to the requester side; otherwise, other methods in the list of available methods are invoked sequentially (i.e., the data table column value generating method is invoked to generate a desired serial number for the scenario), and meanwhile, the currently invoked method (i.e., the database auto-increment ID method) is deleted from the list of available methods, and the method is put into a list of unavailable methods, indicating the database auto-increment ID method is temporarily unavailable.

As for the serial number generating method put into the list of unavailable methods in step S12, the time when the method enters the list of unavailable methods is recorded, and the method is put back into the list of available methods after the elapse of a first set duration (for example, 3 minutes).

In S12, after the serial number generating method is invoked, judgment is made every set cycle (for example, 1 minute) as to whether a desired serial number can be generated by the currently invoked method within a second set duration (10 seconds), if yes, the counter is cleared, and otherwise, the counter is incremented by 1, the counter being used to record whether the serial number generating method continuously times out during the generation of the serial number; judgment is made as to whether a value of the counter is larger than a first set value (i.e., a threshold of the times of continuously timing out), if yes, the method is put in a list of abnormal methods, indicating the method is currently in an abnormal state, and other methods in the list of available methods are invoked sequentially; otherwise, the step of determining whether the value of the counter is larger than the first set value is repeated.

Likewise, as for the method put in the list of abnormal methods, the time when the method enters the list of abnormal methods is recorded, and the method is put back into the list of available methods after the elapse of a third set duration.

Figure 2:
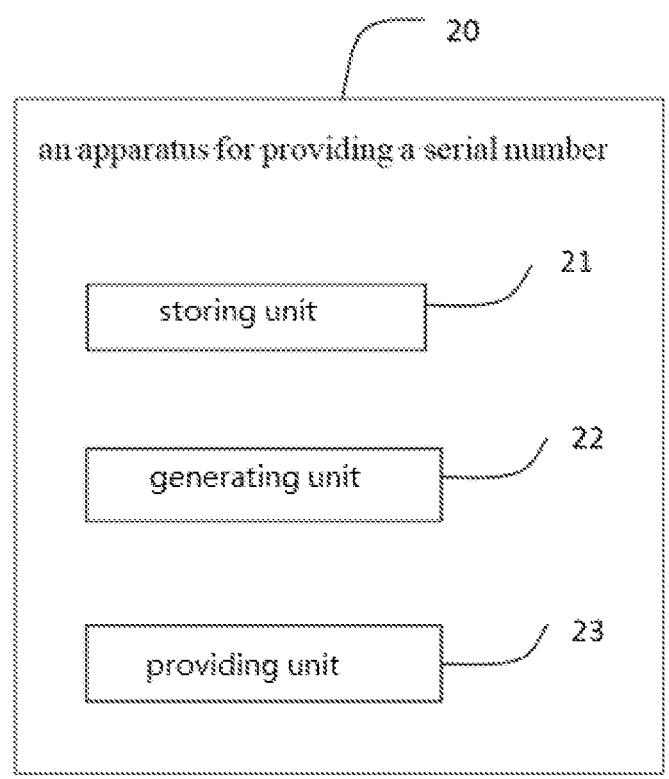
FIG. 2 is a schematic diagram illustrating an apparatus for providing a serial number according to an embodiment of the present application.

FIG. 2 is a schematic diagram illustrating an apparatus for providing a serial number according to an embodiment of the present application. As shown in FIG. 2, the apparatus 20 for providing a serial number according to an embodiment of the present application mainly comprises: a storing unit 21 for storing various serial number generating methods; a generating unit 22 for determining, according to a business scenario of a requester side and from the serial number generating methods, serial number generating methods for the scenario so as to obtain a list of available methods for the scenario; and a providing unit 23 for generating, using a method in the list of available methods, a serial number for the scenario so as to provide the serial number to the requester side.

The generating unit 22 of the apparatus 20 for providing a serial number may be also used for: determining, according to a business scenario of a requester side, methods for generating a serial number required for the scenario, and then writing the determined methods into a list so as to obtain a list of available methods for the scenario.

The providing unit 23 of the apparatus 20 for providing a serial number may be also used for: invoking a serial number generating method that is the first in the list of available methods; determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods.

The apparatus 20 for providing a serial number may further comprise a first recording unit (not shown) for: recording the time when the method enters the list of unavailable methods, and putting the method back into the list of available methods after the elapse of a first set duration.

The apparatus 20 for providing a serial number may further comprise a determining unit (not shown) for: determining whether a desired serial number can be generated by a currently invoked method within a second set duration for every set cycle, and if yes, clearing the counter, and otherwise, incrementing the counter by 1; determining whether a value of the counter is larger than a first set value, if yes, putting the method into a list of abnormal methods; otherwise, repeating the step of determining whether the value of the counter is larger than the first set value.

The apparatus 20 for providing a serial number may further comprise a second recording unit (not shown) for: recording the time when the method enters the list of abnormal methods, and then putting the method back into the list of available methods after the elapse of a third set duration.

According to an embodiment of the present invention, the present invention also provides an apparatus for providing a serial number and a non-transitory computer readable storage medium.

The apparatus for providing a serial number according to the invention comprises: at least one processor; and a memory communicatively connected to at least one processor, wherein the memory stores instructions executable by the one processor, the instructions being executed by the at least one processor to cause the at least one processor to perform the method of providing a serial number as provided in the present invention.

As for the computer readable storage medium of the present invention, the computer readable storage medium stores computer instructions for causing the computer to perform the method of providing a serial number as provided in the present invention.

Figure 3:
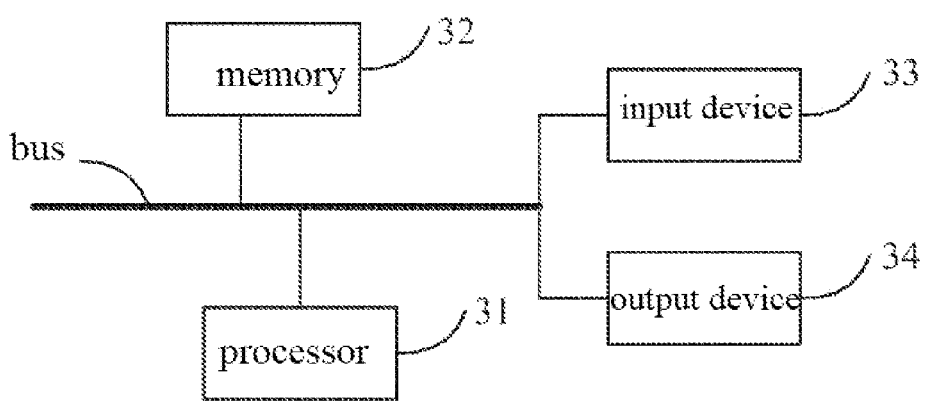
FIG. 3 is a schematic diagram of a hardware structure that implements an electronic device for providing a serial number according to an embodiment of the present application.

FIG. 3 is a schematic diagram of a hardware structure that implements an electronic device for providing a serial number according to an embodiment of the present application. As shown in FIG. 3, the electronic device comprises: one or more processors 31 and a memory 32. In FIG. 3, one processor 31 is taken as an example, wherein the memory 32 is a non-transitory computer readable storage medium as provided in the present invention.

The processor 31 and the memory 32 can be connected via a bus or in other manners. In FIG. 3, connection via a bus is taken as an example.

The memory 32, as a computer readable storage medium, can be used to store software programs, computer executable programs and units, such as the program instructions/units (for example, the storing unit 21, the generating unit 22 and the providing unit 23 as shown in FIG. 2) corresponding to the method for providing a serial number in the embodiment of the present invention. The processor 31 runs the software programs, instructions, and units stored in the memory 32 so as to execute various functional applications and data processing of the server, that is, implement the method of providing a serial number in the above method embodiment.

The memory 32 may include a storage program area and an storage data area, wherein the storage program area may store an operating system, and an application required for at least one function; the storage data area may store data created when the apparatus for providing a serial number is used, and the like. In addition, the memory 32 can include a high speed random access memory, and can also include a non-transitory memory, such as at least one magnetic disk memory device, a flash memory device, or other non-transitory solid state storage devices. In some embodiments, the memory 32 optionally includes a memory remotely located relative to the processor 31, and such remote memory may be connected over a network to the apparatus for providing a serial number. Examples of the above network include, but are not limited to, Internet, Intranet, a local area network, a mobile communication network, and a combination thereof.

An input device 33 can receive methods that generate a serial number respectively, and generate a signal input related to user settings and function control of the device for providing a serial number. An output device 34 can include a display device such as a display screen.

The one or more units are stored in the memory 32, and when executed by the one or more processors 31, perform the method of providing a serial number in any of the above method embodiments.

The above product can perform the method provided in the embodiment of the present invention, and has the functional units and beneficial effects corresponding to the execution method. For technical details that are not described in details in this embodiment, reference may be made to the method provided in the embodiments of the present invention.

In accordance with the technical solution of the present invention, since different serial number generating methods are pre-stored, it is able to configure different serial number generating methods according to different business scenarios, solve the problem of completely depending on one serial number generating method, perform method switching when a method fails, generate a serial number that satisfies the business scenario in time, and finally improve the stability of the logistic distribution system.

The above embodiments do not constitute limitations on the extent of protection of the present invention. Those skilled in the art should note that various modifications, combinations, sub-combinations and substitutions may occur depending on the design requirements and other factors. Any modification, equivalent substitution, improvement and the like made within the spirit and principle of the present invention should be included in the extent of protection of the present invention.

The invention claimed is:

1. A method for providing a serial number, comprising:
storing various serial number generating methods;
determining, according to a business scenario of a requester side and from the serial number generating methods, serial number generating methods for the scenario, and then obtaining a list of available methods for the scenario according to the determined serial number generating methods;
generating, using a method in the list of available methods, a serial number for the scenario so as to provide the serial number to the requester side,
wherein, the step of generating, using a method in the list of available methods, a serial number for the scenario so as to provide the serial number to the requester side comprising:
invoking a serial number generating method that is ranked as the first one in the list of available methods;
determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods; and
after the step of putting the method into the list of unavailable methods, recording the time when the method enters the list of unavailable methods, and putting the method back into the list of available methods after the elapse of a first set duration.

2. The method according to claim 1, wherein, the step of obtaining a list of available methods for the scenario according to the determined serial number generating methods comprising: writing the determined methods into a list so as to obtain the list of available methods for the scenario.

3. The method according to claim 1, further comprising: after the step of invoking the methods in the list of available methods in an order of the list,
determining, for each of a plurality of set cycles, whether a desired serial number can be generated by a currently invoked method within a second set duration, and if yes, clearing the counter, and otherwise, incrementing the counter by 1;
determining whether a value of the counter is larger than a first set value, if yes, putting the method into a list of abnormal methods; otherwise, repeating the step of determining whether the value of the counter is larger than the first set value.

4. The method according to claim 3, further comprising: after the step of putting the method into the list of abnormal methods, recording the time when the method enters the list of abnormal methods, and then putting the method back into the list of available methods after the elapse of a third set duration.

5. The method according to claim 1, wherein, the serial number generating method comprises at least one of: a database auto-increment ID method, a data table column value generating method, a Redis method, and a snowflake method.

6. An apparatus for providing a serial number, comprising:
at least one processor; and
a memory storing instructions, the instructions when executed by the at least one processor, cause the at least one processor to perform operations, the operations comprising:
storing various serial number generating methods;
determining, according to a business scenario of a requester side and from the serial number generating methods, serial number generating methods for the scenario, and then obtaining a list of available methods for the scenario according to the determined serial number generating methods;
generating, using a method in the list of available methods, a serial number for the scenario so as to provide the serial number to the requester side,
wherein, generating, using a method in the list of available methods, a serial number for the scenario so as to provide the serial number to the requester side comprising:
invoking a serial number generating method that is ranked as the first one in the list of available methods;
determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods; and after putting the method into the list of unavailable methods, recording the time when the method enters the list of unavailable methods and putting the method back into the list of available methods after the elapse of a first set duration.

7. The apparatus according to claim 6, wherein, obtaining a list of available methods for the scenario according to the determined serial number generating methods comprising: writing the determined methods into a list so as to obtain a list of available methods for the scenario.

8. The apparatus according to claim 6, wherein, the operations further comprising: after invoking the methods in the list of available methods in an order of the list, determining for each of a plurality of set cycles, whether a desired serial number can be generated by a currently invoked method within a second set duration, and if yes, clearing the counter, and otherwise, incrementing the counter by 1;

determining whether a value of the counter is larger than a first set value, and if yes, putting the method into a list of abnormal methods; and otherwise, repeating the step of determining whether the value of the counter is larger than the first set value.

9. The apparatus according to claim 8, wherein, the operations further comprising: after putting the method into the list of abnormal methods, recording the time when the method enters the list of abnormal methods, and then putting the method back into the list of available methods after the elapse of a third set duration.

10. The apparatus according to claim 6, wherein, the serial number generating method comprises at least one of: a database auto increment ID method, a data table column value generating method, a Redis method, and a snowflake method.

11. A non-transitory computer readable storage medium on which a computer program is stored, wherein, the program implements, when executed by the processors, a method for providing a serial number, the method for providing a serial number comprising:

storing various serial number generating methods;

determining, according to a business scenario of a requester side and from the serial number generating methods, serial number generating methods for the scenario, and then obtaining a list of available methods for the scenario according to the determined serial number generating methods;

generating, using a method in the list of available methods, a serial number for the scenario so as to provide the serial number to the requester side, wherein, the step of generating, using a method in the list of available methods, a serial number for the scenario so as to provide the serial number to the requester side comprising:

invoking a serial number generating method that is ranked as the first one in the list of available methods;

determining whether a desired serial number is successfully generated by the currently invoked method, and if yes, returning the generated serial number to the requester side; otherwise, invoking other methods sequentially in the list of available methods, deleting the currently invoked method from the list of available methods, and putting the method into a list of unavailable methods; and after the step of putting the method into the list of unavailable methods, recording the time when the method enters the list of unavailable methods, and putting the method back into the list of available methods after the elapse of a first set duration.

12. The non-transitory computer readable storage medium according to claim 11, wherein, the step of obtaining a list of available methods for the scenario according to the determined serial number generating methods comprising: writing the determined methods into a list so as to obtain the list of available methods for the scenario.

13. The non-transitory computer readable storage medium according to claim 11, wherein the method for providing a serial number further comprising: after the step of invoking the methods in the list of available methods in an order of the list, determining, for each of a plurality of set cycles, whether a desired serial number can be generated by a currently invoked method within a second set duration, and if yes, clearing the counter, and otherwise, incrementing the counter by 1;

determining whether a value of the counter is larger than a first set value, if yes, putting the method into a list of abnormal methods; otherwise, repeating the step of determining whether the value of the counter is larger than the first set value.

14. The non-transitory computer readable storage medium according to claim 13, wherein the method for providing a serial number further comprising: after the step of putting the method into the list of abnormal methods, recording the time when the method enters the list of abnormal methods, and then putting the method back into the list of available methods after the elapse of a third set duration.

* * * * *